(12) United States Patent
Senda (10) Patent No.: US 8,782,388 B2
(45) Date of Patent: Jul. 15, 2014

(54) INFORMATION PROCESSING APPARATUS, METHOD, AND COMPUTER-READABLE STORAGE MEDIUM THAT ENCRYPT DATA IN A BLOB BASED ON A HASH VALUE

(71) Applicant: Shigeya Senda, Shizuoka (JP)

(72) Inventor: Shigeya Senda, Shizuoka (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/859,453

(22) Filed: Apr. 9, 2013

(65) Prior Publication Data
US 2013/0227267 A1 Aug. 29, 2013

Related U.S. Application Data

(63) Continuation of application No. 12/756,483, filed on Apr. 8, 2010, now Pat. No. 8,438,377.

(30) Foreign Application Priority Data

Apr. 17, 2009 (JP) .................................. 2009-100706
Feb. 8, 2010 (JP) .................................. 2010-025656

(51) Int. Cl.
*G06F 21/00* (2013.01)
(52) U.S. Cl.
USPC ..................................... 713/2; 726/24; 714/21
(58) Field of Classification Search
CPC ......................... G06F 21/575; H04L 2209/127
USPC ......................................................... 713/187
See application file for complete search history.

(56) References Cited

U.S. PATENT DOCUMENTS

| | | | |
|---|---|---|---|
| 7,711,960 B2 * | 5/2010 | Scarlata | 713/182 |
| 8,438,377 B2 * | 5/2013 | Senda | 713/2 |
| 2004/0003273 A1 * | 1/2004 | Grawrock et al. | 713/193 |
| 2007/0073416 A1 | 3/2007 | Grawrock | |
| 2007/0140489 A1 * | 6/2007 | Dharmarajan et al. | 380/228 |
| 2007/0198795 A1 | 8/2007 | Harada | |
| 2007/0226518 A1 | 9/2007 | Yasaki et al. | |
| 2008/0201592 A1 | 8/2008 | Lawrence et al. | |
| 2008/0250252 A1 | 10/2008 | Tasher et al. | |
| 2008/0313627 A1 * | 12/2008 | Segawa | 717/171 |
| 2009/0070598 A1 * | 3/2009 | Cromer et al. | 713/193 |

(Continued)

FOREIGN PATENT DOCUMENTS

| | | |
|---|---|---|
| JP | 63-79120 | 4/1988 |
| JP | 2004-38545 | 2/2004 |

(Continued)

*Primary Examiner* — Hadi Armouche
*Assistant Examiner* — Bryan Wright
(74) *Attorney, Agent, or Firm* — Oblon, Spivak, McClelland, Maier & Neustadt, L.L.P.

(57) ABSTRACT

An information processing apparatus includes a main memory unit storing while on-power; an auxiliary storage unit functionable even off-power; a control unit performing hibernation of generating operating-state data indicating a state when the power is lost, storing the data in the auxiliary storage unit, and, when restored, reading the data from the auxiliary storage unit; and a security chip that including a configuration register, encrypts data, and storing the data in the auxiliary storage unit. The control unit includes: a first registration unit performing, when the data is generated, calculation based thereon to obtain a calculated value; a second registration unit performing, when the data is read from the auxiliary storage unit at the hibernation, calculation based on the data to obtain a calculated value to write it into the configuration register; and a verification unit performing verification at boot-up from the hibernation based on the value written.

11 Claims, 9 Drawing Sheets

(56) References Cited

U.S. PATENT DOCUMENTS

2009/0204964 A1* 8/2009 Foley et al. .................. 718/1
2009/0307499 A1  12/2009 Senda

FOREIGN PATENT DOCUMENTS

| | | |
|---|---|---|
| JP | 2004-38546 | 2/2004 |
| JP | 2005-258642 | 9/2005 |
| JP | 2006-323814 | 11/2006 |
| JP | 2007-213246 | 8/2007 |
| JP | 2007-257197 | 10/2007 |
| JP | 2008-204459 | 9/2008 |
| JP | 2008-226159 | 9/2008 |
| JP | 2008-234217 | 10/2008 |

* cited by examiner

INFORMATION PROCESSING APPARATUS, METHOD, AND COMPUTER-READABLE STORAGE MEDIUM THAT ENCRYPT DATA IN A BLOB BASED ON A HASH VALUE

CROSS-REFERENCE TO RELATED APPLICATIONS

This application is a continuation of and claims the benefit of priority under 35 U.S.C. §120 from U.S. application Ser. No. 12/756,483, filed on Apr. 8, 2010, which claims priority under 35 U.S.C. §119 from Japanese Patent Application No. 2009-100706 filed in Japan on Apr. 17, 2009 and Japanese Patent Application No. 2010-025656 filed in Japan on Feb. 8, 2010, the entire contents of each of which are hereby incorporated by reference.

BACKGROUND OF THE INVENTION

1. Field of the Invention

The present invention is directed generally to an information processing apparatus, and a method and computer program product for verification.

2. Description of the Related Art

More and more functions have been demanded for embedded equipment, in which the functions to be provided by the equipment are embedded in advance, so that volume of firmware in such equipment has been increased year by year. Accordingly, a boot time has become longer, rising a concern that the more functionality provided by equipment, the longer the boot time of the equipment. In other words, as functions that can be provided by equipment increases, boot speed of the equipment decreases. This is because a period of time required to load and initialize a resource becomes longer. Examples of reasons why more and more functions have been provided by the equipment are described below.

Functionality provided by an operating system (OS) and firmware has been advanced. The OS that supports virtual memory has been required to support a large volume of application programs, which resulting in bloating of the OS in size.

Peripherals have been diversified. The number of input/output (I/O) devices to be incorporated in equipment has been increased, arising the necessity for firmware application for the I/O devices. Particularly, advancement of functionality of user interface, such as a panel, results in increase in an amount of required data.

Functionality of software has been advanced. Because competition among products is made on a trend toward functionality advancement so as to be differentiated from other products, the number of functions provided by software exponentially increases.

One of techniques to cope with such a circumstance is "hibernation." In hibernation, memory image stored in a main memory, such as a random access memory (RAM), and data (hereinafter, referred to as operating-state data) that indicates an operating state of equipment, such as context information of hardware such as a central processing unit (CPU), are saved in advance. At boot-up, the thus-saved memory image is expanded, and the context information of the hardware that has been operated and stored in the memory image is restored and operation of the equipment is resumed from the thus-restored point, thereby achieving restoration to the operating state, under which the operating-state data has been saved. Such hibernation allows boot up in a considerably shorter period of time than that of normal boot-up. Techniques related to the hibernation are described in, for instance, Japanese Patent Application Laid-open No. 2004-038545 and Japanese Patent Application Laid-open No. 2004-038546.

Meanwhile, increasing security in embedded equipment has been desired. Under such a circumstance, techniques for preventing tampering of software that operates in embedded equipment have been developed. For instance, disclosed is a scheme with use of a trusted platform module (TPM) that prevents unauthorized execution of software by storing private information about a user in embedded equipment in a concealed manner and performing verification to confirm that software authorized by a manufacture of the embedded equipment be executed on the embedded equipment in, e.g., Japanese Patent Application Laid-open No. 2007-257197.

However, with the technique disclosed in Japanese Patent Application Laid-open No. 2007-257197, hash values or the like of software programs for use at normal boot-up are written into the TPM when performing verification, and then verification is performed by utilizing a fact that what is called a Blob, which is data being an encrypted key, can be decrypted only when a combination of the hash values held in the TPM is correct. Accordingly, the correct combination of the hash values is not obtained at boot-up from hibernation, which differs from normal boot-up, so that it has been difficult to verify software properly.

SUMMARY OF THE INVENTION

It is an object of the present invention to at least partially solve the problems in the conventional technology.

According to an aspect of the present invention, there is provided an information processing apparatus comprising: a main memory unit that retains contents stored therein only while the main memory unit is receiving electric power supply; an auxiliary storage unit that retains contents stored therein even after the electric power supply is lost; a control unit that performs hibernation of generating operating-state data that indicates an operating state of the information processing apparatus at a time when the electric power supply is lost, storing the operating-state data in the auxiliary storage unit, and, when electric power supply is restored, reading the operating-state data from the auxiliary storage unit to restore the information processing apparatus to the operating state; and a security chip that includes a configuration register, encrypts data by using a value written into the configuration register, and stores the data in the auxiliary storage unit, wherein the control unit includes: a first registration unit that performs, when the control unit generates the operating-state data, calculation based on the operating-state data to obtain a calculated value and writes the value to the configuration register; a second registration unit that performs, when the control unit reads the operating-state data from the auxiliary storage unit at the hibernation, calculation based on the operating-state data to obtain a calculated value and writes the value to the configuration register; and a verification unit that performs verification at boot-up from the hibernation by determining whether to permit decryption of the data encrypted by the security chip based on the value written into the configuration register by the second registration unit.

According to another aspect of the present invention, there is provided a verification method that is performed in an information processing apparatus that includes a main memory unit that retains contents stored therein only while the main memory unit is receiving electric power supply; an auxiliary storage unit that retains contents stored therein even after the electric power supply is lost; a control unit that performs hibernation of generating operating-state data that indicates an operating state of the information processing apparatus at a time when the electric power supply is lost, storing the operating-state data in the auxiliary storage unit, and when electric power supply is restored, reading the operating-state data from the auxiliary storage unit to restore the information processing apparatus into the operating state; and a security chip that includes a configuration register, encrypts data by using a value written into the configuration register, and stores the data in the auxiliary storage unit, the verification method comprising: first registering, when the control unit generates the operating-state data, a calculated value based on the operating-state data to write the calculated value into the configuration register; second registering, when the control unit reads the operating-state data from the auxiliary storage unit at the hibernation, a calculated value based on the operating-state data to write the calculated value into the configuration register; and verifying, which is performed by the control unit, a boot-up from the hibernation by determining whether to permit decryption of the data encrypted by the security chip based on the value written into the configuration register at the second registering.

According to still another aspect of the present invention, there is provided a computer program product comprising a computer-usable medium having computer-readable program codes embodied in the medium for processing information in an information processing apparatus that includes a main memory unit that retains contents stored therein only while the main memory unit is receiving electric power supply; an auxiliary storage unit that retains contents stored therein even after the electric power supply is lost; a control unit that performs hibernation of generating operating-state data that indicates an operating state of the information processing apparatus at a time when the electric power supply is lost, storing the operating-state data in the auxiliary storage unit, and when electric power supply is restored, reading the operating-state data from the auxiliary storage unit to restore the information processing apparatus into the operating state; and a security chip that includes a configuration register, encrypts data by using a value written into the configuration register, and res the data in the auxiliary storage unit, the program codes when executed causing a computer to execute: first registering, when the control unit generates the operating-state data, a calculated value based on the operating-state data to write the calculated value into the configuration register; second registering, when the control unit reads the operating-state data from the auxiliary storage unit at the hibernation, a calculated value based on the operating-state data to write the calculated value into the configuration register; and verifying, which is performed by the control unit, a boot-up from the hibernation by determining whether to permit decryption of the data encrypted by the security chip based on the value written into the configuration register at the second registering.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an information processing apparatus, and a method and computer program product for verification according to the present invention are described in detail below with reference to the accompanying drawings.

Figure 1:
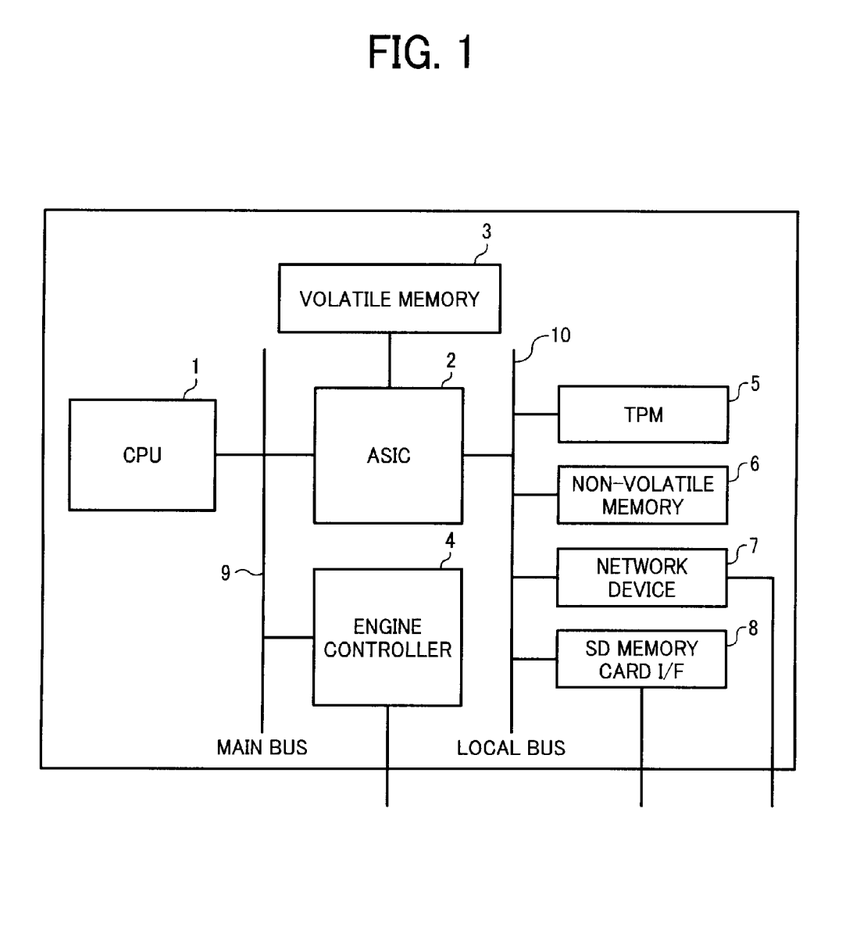
FIG. 1 is a schematic diagram illustrating a hardware configuration of an information processing apparatus according to an embodiment of the present invention.

FIG. 1 is a schematic diagram illustrating a hardware configuration of an information processing apparatus according to an embodiment of the present invention. The information processing apparatus according to the embodiment can be applied to a personal computer, an image forming apparatus that has at least one function of a copier function, a printer function, a scanner function, and a facsimile function or a multifunction product that has two or more functions of these functions. The information processing apparatus illustrated in FIG. 1 includes a CPU 1, an application specific integrated circuit (ASIC) 2, a volatile memory 3, an engine controller 4, a TPM 5, a non-volatile memory 6, a network device 7, and a secure digital (SD) memory card interface (I/F) 8. The CPU 1 is connected to the ASIC 2 and the engine controller 4 via a main bus 9. The ASIC 2 is connected to the volatile memory 3 as well as connected to the TPM 5, the non-volatile memory 6, the network device 7, and the SD memory card I/F 8 via a local bus 10.

The CPU 1 executes various computer programs stored in the non-volatile memory 6, thereby controlling the entire information processing apparatus and providing various functions. The ASIC 2 is an integrated circuit for performing, for instance, image processing. The volatile memory 3 is a main storage unit that temporarily stores various computer programs and various data and retains the thus-stored contents only while electric power is supplied to the volatile memory 3. The non-volatile memory 6 is an auxiliary storage unit that stores various computer programs and various data and is capable of retaining the thus-stored contents even while electric power supply to the non-volatile memory 6 is lost. The non-volatile memory 6 stores therein a hibernation image generated by the CPU 1 and context information of the CPU 1. The TPM 5 is arranged on the local bus 10 and capable of providing functions of secret information encryption and decryption, and platform authentication for authenticating a platform. Specifically, the TPM 5 is a security chip that incorporates unique secret information and configuration registers therein, and constructed such that the secret information cannot be physically taken out unless otherwise the TPM 5 is destroyed. In the present embodiment, data combined with the configuration registers to thus be encrypted is referred to as a blob. The blob is configured such that the blob can be decrypted only when the TPM that retains unique secret information is used, and a match occurs with a combination of values written to configuration registers when the blob is generated. Put another way, access to the data contained in the blob become thus possible. Functions to be provided by the information processing apparatus are embedded therein in advance by employing such a configuration as discussed above.

Figure 2:
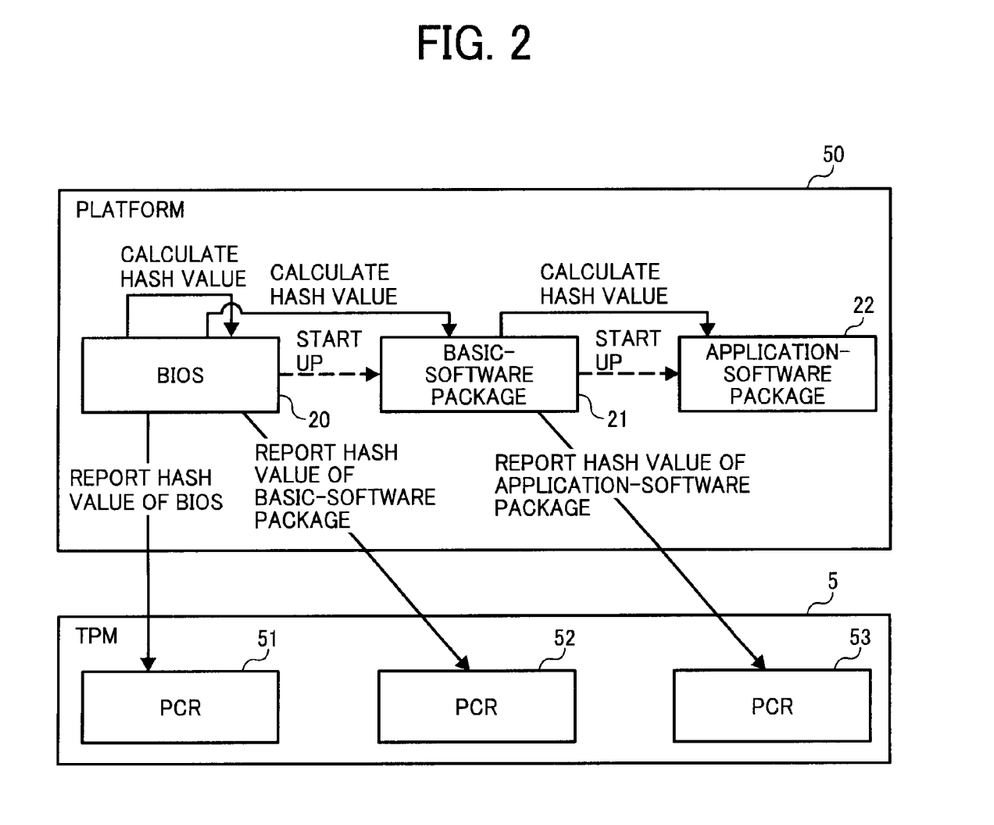
FIG. 2 is a schematic diagram illustrating operations of a TPM at normal boot-up.

Encryption and decryption of information by using the TPM 5 are briefly described below. FIG. 2 is a schematic diagram illustrating operations of the TPM at normal boot-up. A platform 50 illustrated in FIG. 2 is loaded onto the volatile memory 3 when computer programs are executed by the CPU 1. The platform 50 includes, as software programs, a basic input output system (BIOS) 20, a basic-software package 21, and an application-software package 22. A chain of trust is build with these software programs. Although not illustrated in the drawings, the basic-software package 21 contains an OS that has a file system. The BIOS 20 has a function of generating a hibernation image for use in hibernation from contents stored in the volatile memory 3 as operating-state data that indicates an operating state of the information processing apparatus and storing the hibernation image and context information of the CPU 1 in the non-volatile memory 6. The TPM 5 includes, as configuration registers, a platform configuration register (PCR) 51, a PCR 52, and a PCR 53. The PCR 51 corresponds to PCR[0], the PCR 52 corresponds to PCR[1], and the PCR 53 corresponds to PCR[2].

In the platform 50, when a core portion of the BIOS 20 is started up, the core portion calculates a hash value of the BIOS 20 and writes the hash value into the PCR 51 in the TPM 5. The BIOS 20 calculates the hash value by using, for instance, a calculating method of generating a pseudo-random number of a fixed length from a target original. Thereafter, the entire BIOS 20 is started up. Subsequently, the BIOS 20 calculates a hash value related to the basic-software package 21, writes the hash value into the PCR 52 in the TPM 5, and thereafter starts up the basic-software package 21. The hash value related to the basic-software package 21 is a hash value obtained based on executable code including the OS and data that are to be loaded onto the volatile memory 3. The basic-software package 21 calculates a hash value related to the application-software package 22, writes the hash value into the PCR 53 in the TPM 5, and thereafter starts up the application-software package 22. The hash value related to the application-software package 22 is a hash value obtained based on the application-software package 22 and data for use in the application-software package 22. As illustrated above, in response to boot-up of the information processing apparatus, the hash values calculated based on the BIOS 20, the basic-software package 21, and the application-software package 22 are written into the PCRs 51 to 53 in the TPM 5.

Figure 3:
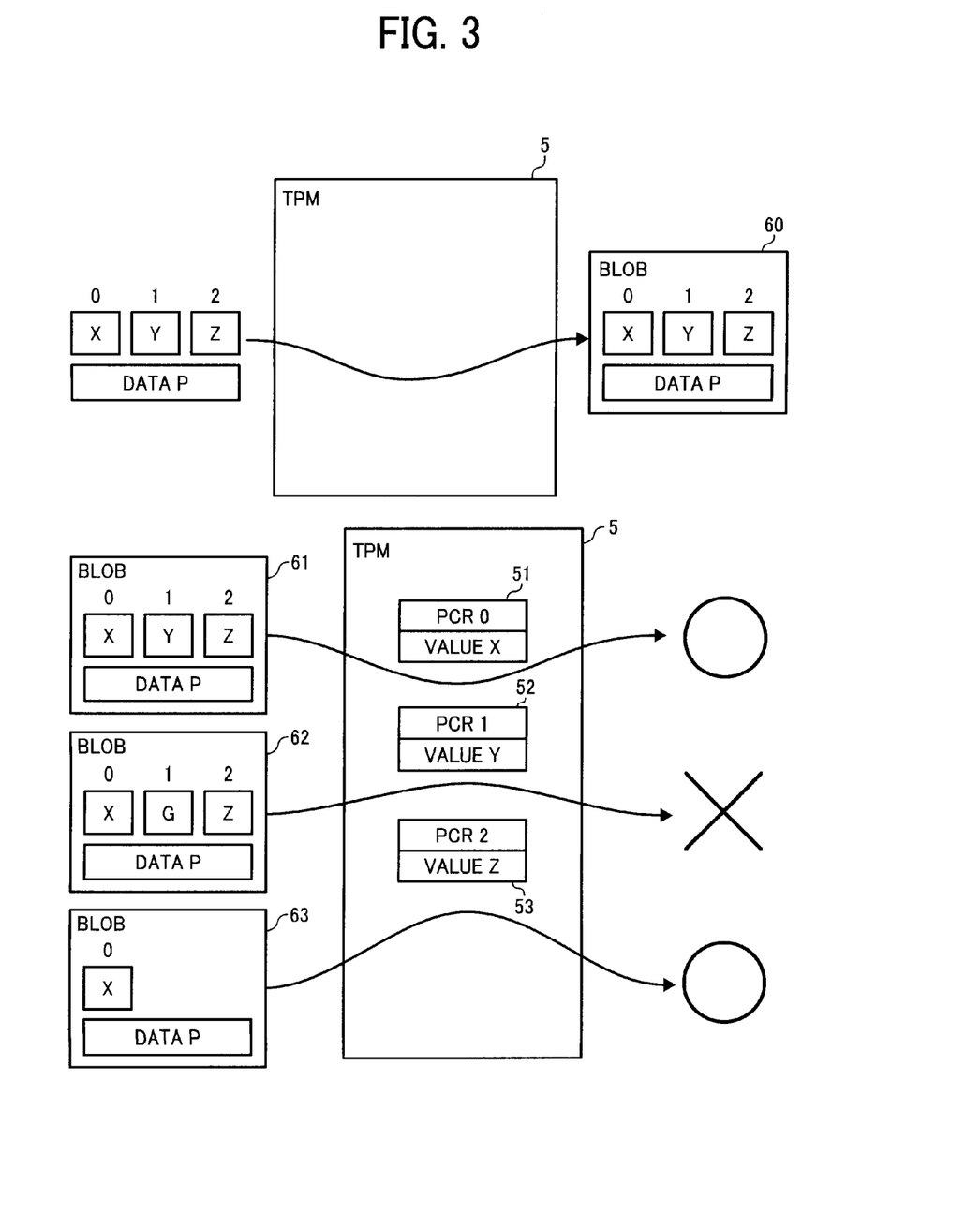
FIG. 3 is a schematic diagram illustrating information encryption and decryption by using the TPM.

FIG. 3 is a schematic diagram illustrating information encryption and decryption by using the TPM. Encryption of "Data P" by the TPM 5 is illustrated in an upper portion of FIG. 3. The TPM 5 generates a blob 60 based on Data P to be encrypted and hash values X, Y, and Z held in PCR[0], PCR[1], and PCR[2], and stores the blob 60 in the non-volatile memory 6.

Decryption of blobs 61, 62, and 63 by the TPM 5 is illustrated in a lower portion of FIG. 3. When the information processing apparatus is booted up, three hash values, or specifically X, Y, and Z calculated based on the BIOS 20, the basic-software package 21, and the application-software package 22, have been held in the PCRs 51 to 53 in the TPM 5.

The blobs (Blobs) 61 to 63 each containing "Data P" are managed by a file system. In the blob 61, X is held in PCR[0], Y is held in PCR[1], and Z is held in PCR[2]. In the blob 62, X is held in PCR[0], G is held in PCR[1], and Z is held in PCR[2]. In the blob 63, X is held in PCR[0].

Because the hash values of PCR[0], PCR[1], and PCR[2] in the blob 61 are equal to the hash values held in PCR[0], PCR[1], and PCR 53 in the TPM 5, the TPM 5 permits access to "Data P" contained in the blob 61. In contrast, because the hash value of PCR[1] in the blob 62 differs from the hash value held in PCR[1] in the TPM 5, the TPM 5 does not permit access to Data P contained in the blob 62. Because the hash value of PCR[0] in the blob 63 is equal to the hash value held in PCR[0] in the TPM 5, the TPM 5 permits access to Data P contained in the blob 63. Meanwhile, the TPM 5 does not utilize PCR[1] and PCR[2], in each of which a hash value is not held as in the case of the blob 63, in determination as to whether to permit access to Data P.

In other words, with regard to combination in a blob, access to Data P contained in the blob 63 is permitted when a match with the single hash value held in PCR[0] occurs. While access to Data P, contained in the blob 61 or in the blob 62, is permitted when a match with the three hash values held in PCR[0], PCR[1], and PCR[2] occurs. Meanwhile, making an access to Data P contained in a blob is equivalent to decryption of the blob.

A verification process will be described below. It is assumed that a blob contains Data P that is an encryption key for use in encrypting secret information and decrypting encrypted secret information. Whether access to the encryption key is permitted, or, put another way, whether decryption of the blob is permitted, is determined depending on whether a match with every hash value held in PCR[0], PCR[1], and PCR[2] occurs. If access to the encryption key is permitted, the CPU 1 can decrypt the encrypted data with the encryption key. If access to the encryption key is not permitted, the CPU 1 determines that verification error has occurred. The process discussed above is the verification process.

Figure 4:
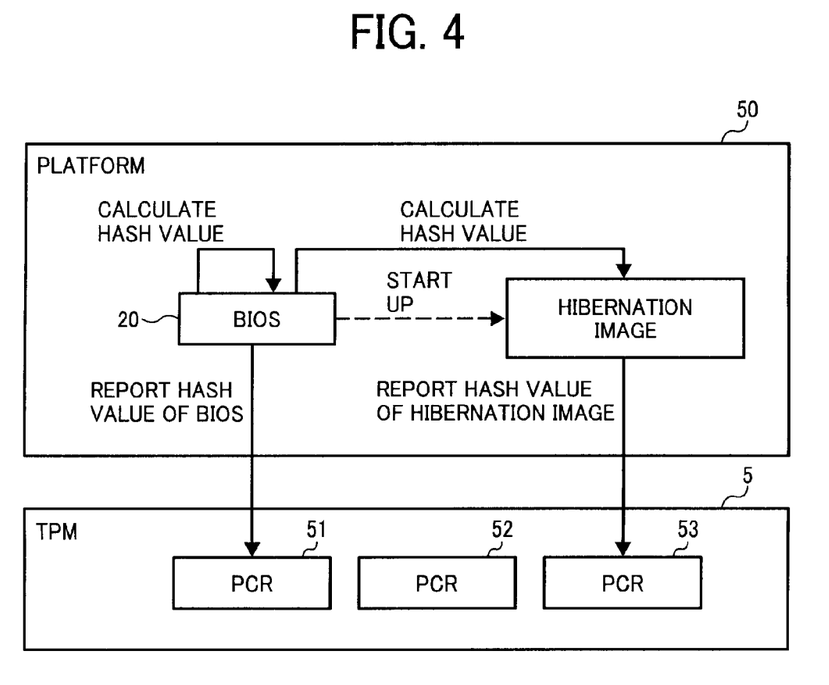
FIG. 4 is a schematic diagram illustrating information encryption and decryption by using the TPM.

An overview of operations of the TPM 5 at boot-up from hibernation will be described with reference to FIG. 4. In the platform 50, when the BIOS 20 has generated a hibernation image and stored the hibernation image and context information of the CPU 1 in the non-volatile memory 6, the BIOS 20 calculates a hash value based on the hibernation image and the context information and writes the hash value to the PCR 53 in the TPM 5. When the core portion of the BIOS 20 has been started up at boot-up from hibernation later, the core portion calculates a hash value of the BIOS 20 and writes the hash value to the PCR 51 in the TPM 5. Thereafter, the entire BIOS 20 is started up. Thereafter, the BIOS 20 reads the hibernation image and the context information of the CPU 1 from the non-volatile memory 6 as well as calculates a hash value of the hibernation image and the context information and writes the hash value to the PCR 53 in the TPM 5. Meanwhile, the TPM 5 generates a blob that contains a combination of hash values of the PCRs 51 to 53 (see the lower box of FIG. 4) as a combination with which the blob can be decrypted at normal boot-up, generates a combination of hash values of the PCRs 51 and 53 as a combination with which the blob can be decrypted at boot-up from hibernation, and generates an encryption key, and stores the blob in the non-volatile memory 6.

Figure 5:
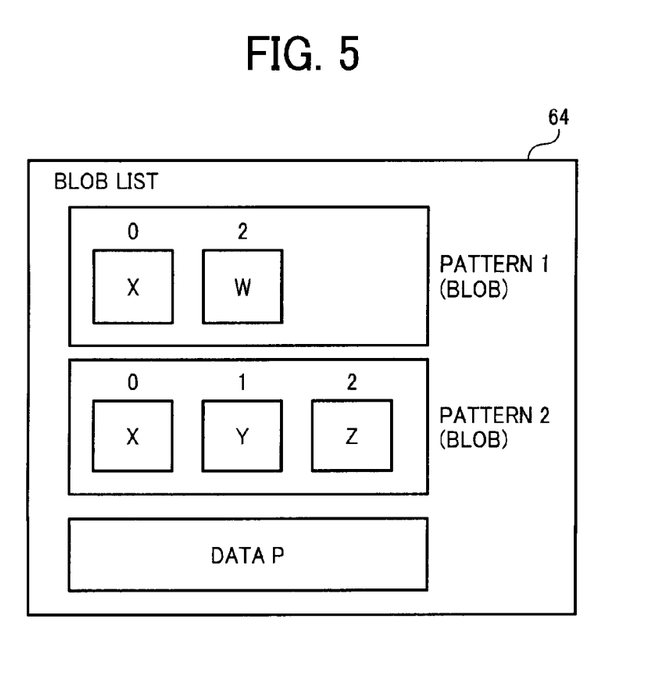
FIG. 5 is a schematic diagram illustrating operations of the TPM at boot-up from hibernation.

In the present embodiment, a blob list that contains a plurality of combinations of values of PCR[0], PCR[1], and PCR[2] is used. FIG. 5 is a schematic diagram illustrating a blob that contains a plurality of combinations of values of PCR[0], PCR[1], and PCR[2]. A blob list 64 contains a pattern-1 blob (see the top box of FIG. 5) where X is held in PCR[0] and W is held in PCR[2], and a pattern-2 blob (see the lower box of FIG. 5) where X is held in PCR[0], Y is held in PCR[1], and Z is held in PCR[2]. In the present embodiment, as discussed above, a hash value of the BIOS 20 is written to PCR[0], a hash value of the basic-software package 21 is written to PCR[1], and a hash value of the application-software package 22 is written to PCR[2] at normal boot-up. In contrast, at boot-up from hibernation, a hash value of the BIOS 20 is written to PCR[0] and a hash value of a hibernation image and context information is written to PCR[2]. At normal boot-up, the TMP 5 determines whether to permit access to an encryption key based on the pattern-2 blob illustrated in FIG. 5 while, at boot-up from hibernation, the TPM 5 determines whether to permit access to the encryption key based on the pattern-1 blob illustrated in FIG. 5. A chain of trust is built by setting values of PCR[0], PCR[1], and PCR [2], which are the configuration registers, for each different boot-up-stage as discussed above.

Figure 6:
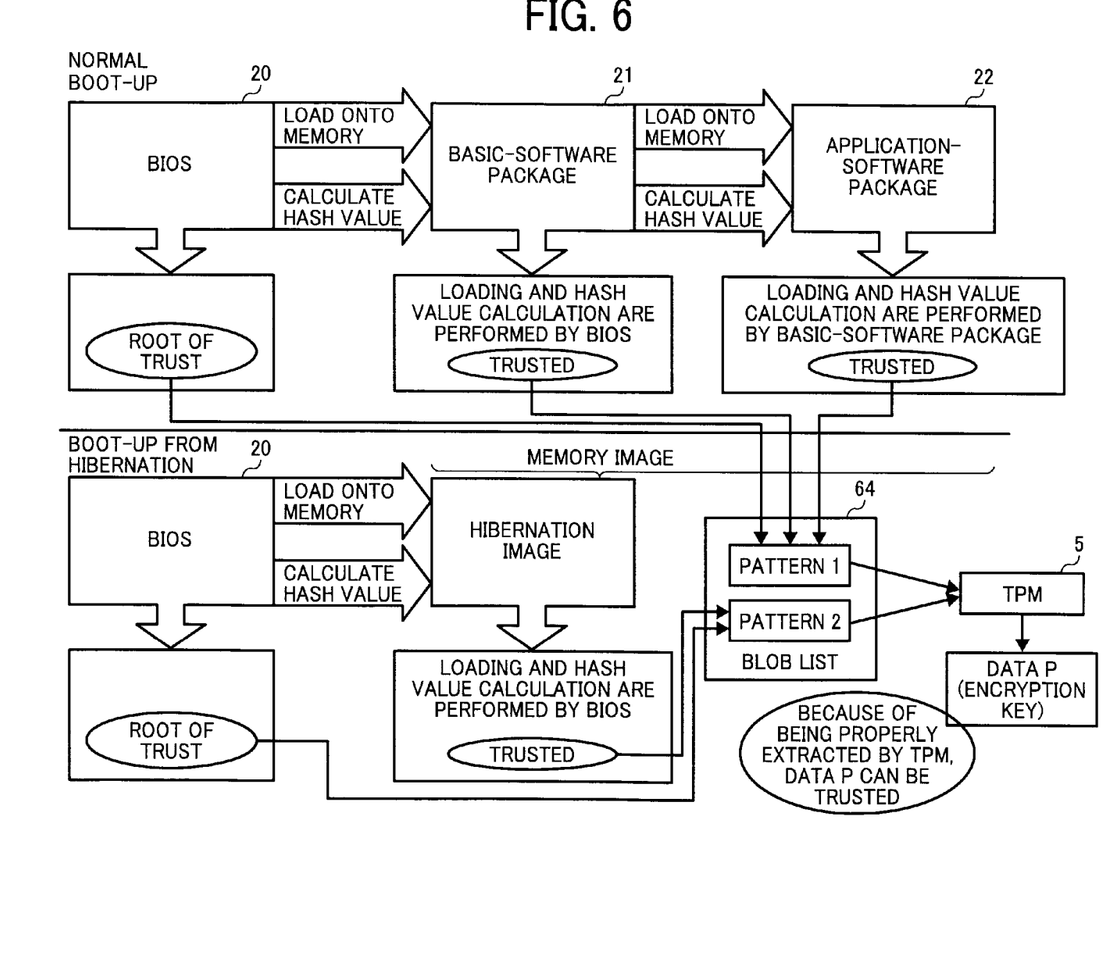
FIG. 6 is a schematic diagram for explaining a chain of trust.

The chain of trust will be described specifically with reference to FIG. 6. Trustworthiness of the BIOS 20 serves as base of trustworthiness of other modules so that it is referred to as root of trust. Specifically, trustworthiness of the BIOS 20 is ensured by storing a portion or all of the TPM 5 and the BIOS 20 into the non-volatile memory 6 or by utilizing specific command of the CPU 1. In this example, it is assumed that trustworthiness of the BIOS 20 has already been ensured by some means. As for processes to be performed after the BIOS 20 has been started up, loading onto memory and calculation of a hash value for each of basic-software package, application-software package, and hibernation image can be trusted because the loading and the calculations are loaded by a trusted module provided at a preceding stage. Because operations of the module can be trusted, the hash value of the module can be trusted. An encryption key (Data P) obtained from the pattern-1 blob or the pattern-2 blob through the TPM 5 by using a trusted combination of hash values can be trusted. Accordingly, it can be said that an end result, or the-thus extracted encryption key, can be trusted. Chain of trust is built as discussed above by extending trust to form a chain.

Figure 7:
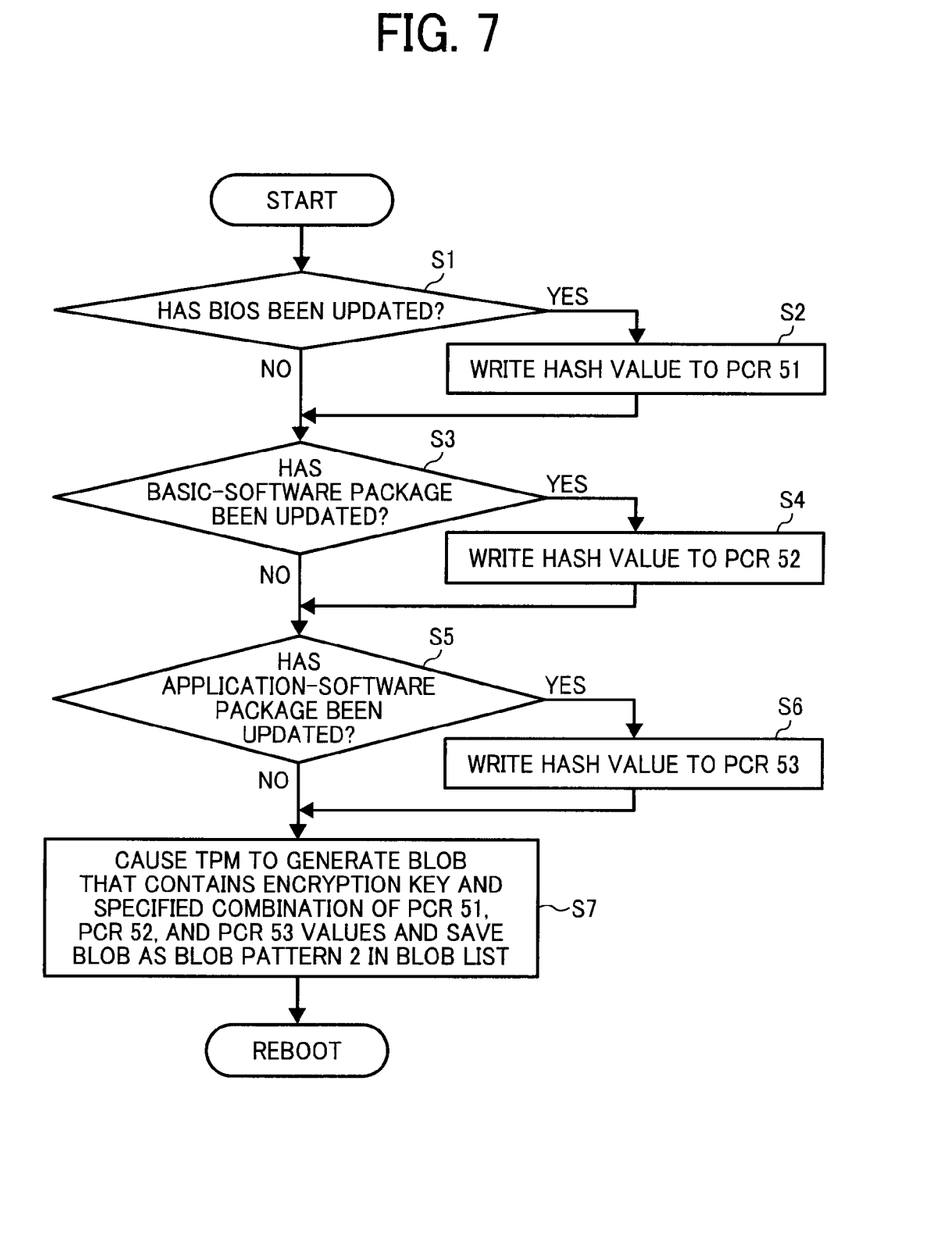
FIG. 7 is a flowchart of a procedure of a conventional TPM registration process.

Described blow is the procedures of the TPM registration process and the verification process to be performed by the information processing apparatus according to the present embodiment. Before explaining the procedures, described below are procedures of a conventional TPM registration process and a conventional verification process. FIG. 7 is a flowchart of the procedure of the conventional TPM registration process. When at least one of the BIOS 20, which is in a security-ensured environment or has been authenticated by some verification means, the basic-software package 21, and the application-software package 22 is updated and freshly installed, it is necessary to obtain a new hash value of the thus-updated software to use a correct blob at next boot-up. The TPM registration process described below is performed to update a blob so that the blob contains the new hash value. Meanwhile, it is assumed that the updated software contains an encryption key. If the BIOS 20 has been updated (YES at Step S1), a hash value of the BIOS 20 is calculated and written to the PCR 51 in the TPM 5 (Step S2), after which control proceeds to Step S3. If the BIOS 20 has not been updated (NO at Step S1), control proceeds to Step S3 as well. If the basic-software package 21 has been updated (YES at Step S3), the BIOS 20 calculates a hash value related to the basic-software package 21 and writes the hash value to the PCR 52 in the TPM 5 (Step S4), after which control proceeds to Step S5. If the basic-software package 21 has not been updated (NO at Step S3), control proceeds to Step S5 as well. If the application-software package 22 has been updated (YES at Step S5), the basic-software package 21 calculates a hash value related to the application-software package 22 and writes the hash value to the PCR 53 in the TPM 5 (Step S6), after which control proceeds to Step S7. If the application-software package 22 has not been updated (NO at Step S5), control proceeds to Step S7 as well. At Step S7, the TPM 5 receives the encryption key from each of the updated software programs, generates a blob that contains the encryption key (corresponding to Data P in the examples illustrated in FIG. 3 and FIG. 5) and the hash values each held in a corresponding one of the PCRs 51 to 53, and stores the blob in the non-volatile memory 6 as the pattern-2 blob in the blob list 64. When the information processing apparatus is rebooted later, the software programs are started up as discussed above with reference to FIG. 2, whereby normal boot-up is performed. The procedure for performing the verification process in this case will be described below with reference to FIG. 8.

Figure 8:
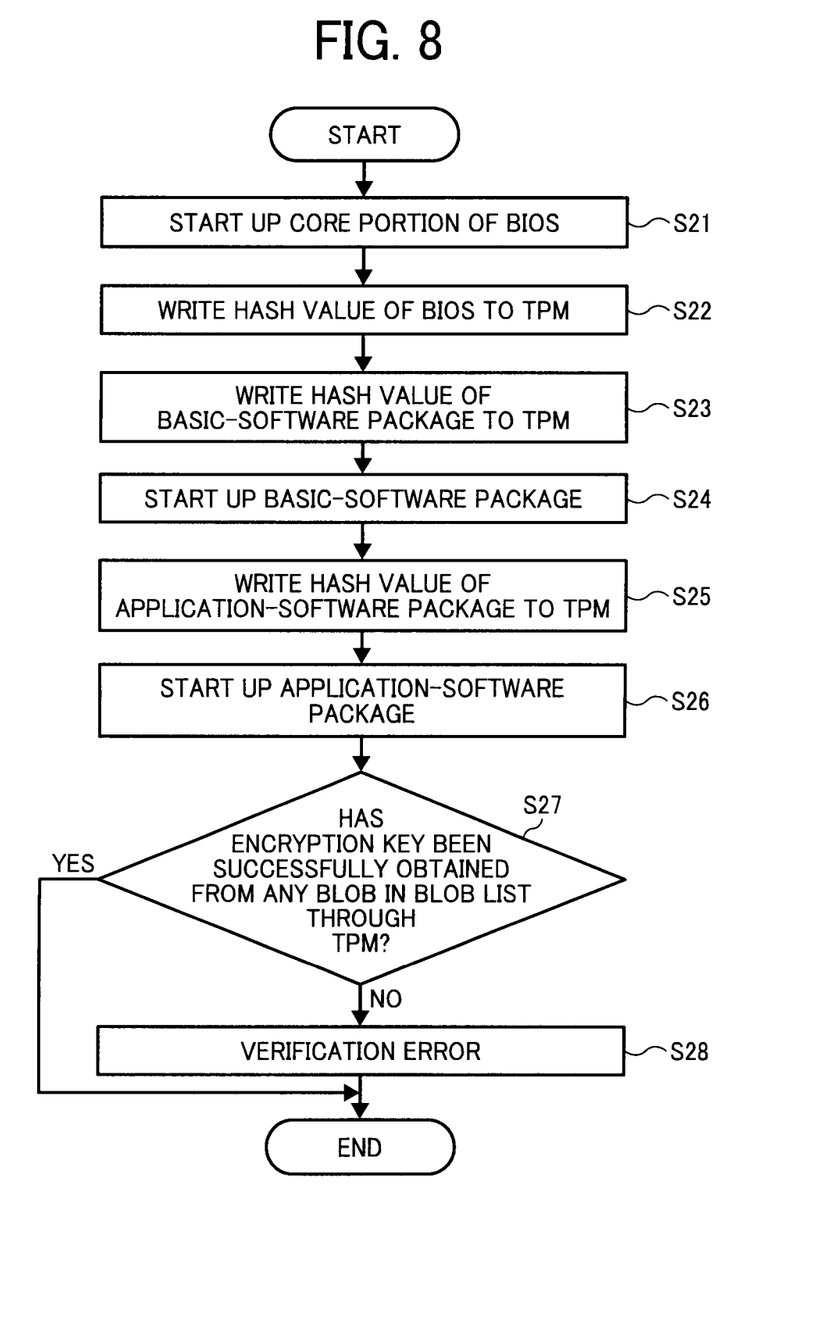
FIG. 8 is a flowchart of a procedure of a verification process at normal boot-up.

When the core portion of the BIOS 20 is started up (Step S21), the core portion of the BIOS 20 calculates a hash value of the BIOS 20 and writes the hash value to the PCR 51 in the TPM 5 (Step S22). Thereafter, the entire BIOS 20 is started up. Thereafter, the BIOS 20 calculates a hash value related to the basic-software package 21 and writes the hash value to the PCR 52 in the TPM 5 (Step S23). The BIOS 20 starts up the basic-software package 21 (Step S24). The basic-software package 21 calculates a hash value related to the application-software package 22 and writes the hash value to the PCR 53 in the TPM 5 (Step S25). The basic-software package 21 starts up the application-software package 22 (Step S26). Subsequently, the TPM 5 determines whether to permit access to the encryption key contained in the blob based on the blob generated in the TPM registration process discussed above with reference to FIG. 7 and the hash values held in the PCRs 51 to 53. For instance, if a match between all the hash values held in the PCRs 51 to 53 and the hash values contained in any one of the blobs (the pattern-1 blob and the pattern-2 blob) in the blob list 64 illustrated in FIG. 5 occurs, the TPM 5 permits access to the encryption key contained in the blob (YES at Step S27). In this case, the CPU 1 decrypts encrypted secret information with the encryption key. In contrast, if at least one of all the hash values held in the PCRs 51 to 53 in the blobs (the pattern-1 blob and the pattern-2 blob) in the blob list 64 fails to match a corresponding one of the hash values held in the PCRs 51 to 53 (NO at Step S27), the TPM 5 does not permit access to the encryption key contained in the blob. In this case, the CPU 1 determines that verification error has occurred and ends the process (Step S28).

Subsequently, described below are procedures of a TPM registration process and a verification process according to the present embodiment. In the TPM registration process according to the present embodiment, TPM registration is additionally performed so that verification can be performed also at boot-up from hibernation in a state where the conventional TPM registration process discussed above has been performed, by which hash values are written to the PCRs 51 to 53 and verification with the conventional verification process can be performed. Described below is the procedure of the TPM registration process according to the present invention with reference to FIG. 9.

Figure 9:
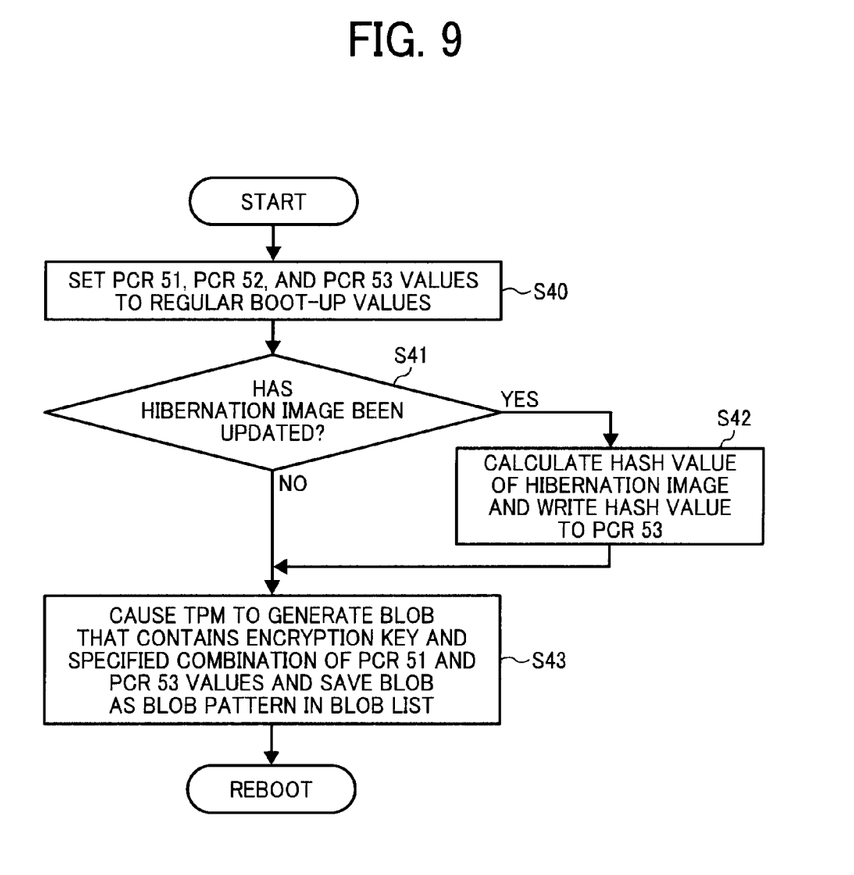
FIG. 9 is a flowchart of a procedure of a TPM registration process according to the present embodiment.

It is assumed that a combination of hash values, with which a blob can be decrypted at normal boot-up, has been written to the PCRs 51 to 53 in advance (Step S40). This is a condition satisfied without fail if normal boot-up has been performed. When generating a hibernation image and storing the hibernation image and context information of the CPU 1 in the non-volatile memory 6 (YES at Step S41), the BIOS 20 calculates a hash value based on the hibernation image and the context information. The BIOS 20 writes the thus-calculated hash value to the PCR 53 in the TPM 5 (Step S42), after which operation proceeds to Step S43. If generation of a hibernation image is not performed (NO at Step S41), the BIOS 20 skips the operation to be performed at Step S42, and control proceeds to Step S43. At Step S43, the TPM 5 generates a blob that contains a combination of hash values of the PCRs 51 and 53 as a combination with which the blob can be decrypted at boot-up from hibernation, and an encryption key, and stores the blob in the non-volatile memory 6 as, for instance, the pattern-1 blob in the blob list 64 illustrated in FIG. 5. When the information processing apparatus is rebooted later, the core portion of the BIOS 20 is started up. Described below is the procedure of the verification process for a case where the reboot is performed from hibernation with reference to FIG. 10.

Figure 10:
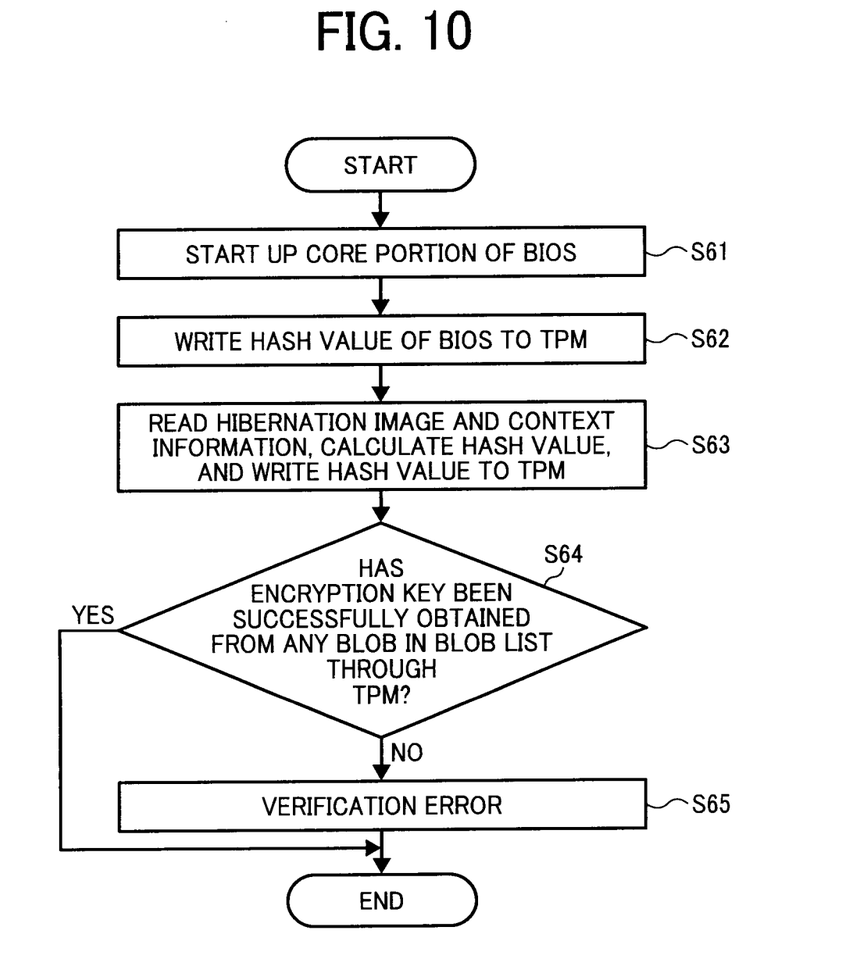
FIG. 10 is a flowchart of a procedure of a verification process at boot-up from hibernation.

When the core portion of the BIOS 20 is started up (Step S61), the core portion of the BIOS 20 calculates a hash value of the BIOS 20 and writes the hash value to the PCR 51 in the TPM 5 (Step S62). Thereafter, the entire BIOS 20 is started up. Thereafter, the BIOS 20 reads the hibernation image and the context information of the CPU 1 from the non-volatile memory 6, and calculates a hash value of the hibernation image and the context information so as to write the hash value to the PCR 53 in the TPM 5 (Step S63). Subsequently, the TPM 5 determines whether to permit access to the encryption key contained in the blob based on the blob generated in the TPM registration process discussed above with reference to FIG. 7 and the hash values held in the PCR 51 and the PCR 53. For instance, if occurs a match between all the hash values held in the PCR 51 and the PCR 53 and the hash values contained in any one of the blobs (the pattern-1 blob and the pattern-2 blob) in the blob list 64 illustrated in FIG. 5, the TPM 5 permits access to the encryption key contained in the blob (YES at Step S64). In this case, the CPU 1 decrypts encrypted secret information with the encryption key. In contrast, if at least one of all the hash values held in the PCR 51 and the PCR 53 in the blobs (the pattern-1 blob and the pattern-2 blob) in the blob list 64 fails to match a corresponding one of the hash values held in the PCR 51 and the PCR 53, the TPM 5 does not permit access to the encryption key contained in the blob. In this case, the CPU 1 determines that verification error has occurred and ends the process (Step S65).

If normal boot-up is performed after the TPM registration process illustrated in FIG. 9, the verification process at normal boot-up illustrated in FIG. 8 is performed by using, for instance, the pattern-2 blob in the blob list 64 illustrated in FIG. 5.

As discussed above, also at boot-up from hibernation, configuration register values can be properly verified by making a challenge of obtaining an encryption key against a blob list that contains a combination of configuration register values for use at normal boot-up and a combination of configuration register values for use at boot-up from hibernation. This allows verifying that software has been validly installed before the software is started up. Accordingly, according to the present embodiment, even at boot-up from hibernation, software can be verified properly.

Specifically, according to the present embodiment, a blob, containing a combination of configuration register values for use in verification at normal boot-up as illustrated in FIG. 8, is generated. And, on a precondition that a hibernation image is to be generated, the blob is updated so as to contain a combination of configuration register values for use in verification at boot-up from hibernation, whereby a chain of trust is kept even if the verification process illustrated in FIG. 8 is performed at boot-up from hibernation.

The present invention is not limited to the embodiments discussed above, and when being put into practice, constituent elements of the invention can be modified without departing from the spirit of the invention. In addition, various embodiments can be made by suitably combining the constituent elements disclosed in the embodiments. For example, some constituent elements can be omitted from all the constituent elements described in the embodiments. Constituent elements of different embodiments can be suitably combined. Various modifications, some of which are described below, can be made.

Computer programs to be executed by the information processing apparatus according to the embodiment can be stored in a computer connected to a network such as the Internet so that the computer programs are provided by downloading via the network. The computer programs can be stored in a computer-readable recording medium, such as a compact disk read only memory (CD-ROM), a flexible disk (FD), a compact disk recordable (CD-R), or a digital versatile disk (DVD), in an installable format or an executable format so that the computer programs are provided as a computer program product.

In the embodiment discussed above, to use less PCR registers, the PCR register (the PCR 53), which is used also at normal boot-up, is used as the PCR register that holds a hash value of a hibernation image; however, another register that is not used at normal boot-up can alternatively be used.

According to an aspect of the present invention, software can be verified properly even at boot-up from hibernation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An information processing apparatus comprising:
   a blob list that includes a first blob and a second blob therein, the first blob and the second blob including data that is encrypted based on a hash value;
   a security unit, implemented by circuitry, that decrypts the data from the blob list based on a hash value that is calculated at boot-up of the information processing apparatus; and
   a verification unit, implemented by circuitry, that, at boot-up from hibernation of the information processing apparatus,
      determines that a verification error has not occurred in response to the security unit decrypting the data from either the first blob or the second blob based on the hash value calculated at the boot-up, and
      determines that a verification error has occurred in response to the security unit neither decrypting the data from the first blob nor from the second blob based on the hash value calculated at the boot-up, wherein the data in the first blob is encrypted based on the hash value that is calculated from operating-state data generated at the hibernation of the information processing apparatus, and the data in the second blob is encrypted based on the hash value that is previously calculated from software program needed for an operation of the information processing apparatus.

2. An information processing apparatus comprising:
a blob list that includes a first blob and a second blob therein, the first blob and the second blob including data that is encrypted based on a hash value;
a security unit, implemented by circuitry, that decrypts the data from the blob list based on a hash value that is calculated at boot-up of the information processing apparatus; and
a verification unit, implemented by circuitry, that
determines that a verification error has not occurred in response to the security unit decrypting the data from either the first blob or the second blob based on the hash value calculated at the boot-up, and
determines that a verification error has occurred in response to the security unit neither decrypting the data from the first blob nor from the second blob based on the hash value calculated at the boot-up, wherein
the data in the first blob is encrypted based on the hash value that is calculated from operating-state data generated at hibernation of the information processing apparatus, the security unit generates the first blob by encrypting the data based on the hash value that is calculated from the operating-state data generated at the hibernation of the information processing apparatus, and
the verification unit performs verification at boot-up from the hibernation by determining whether to permit decryption of the data based on the hash value calculated from the operating-state data at the boot-up from the hibernation.

3. An information processing apparatus comprising:
a blob list that includes a first blob and a second blob therein, the first blob and the second blob including data that is encrypted based on a hash value;
a security unit, implemented by circuitry, that decrypts the data from the blob list based on a hash value that is calculated at boot-up of the information processing apparatus; and
a verification unit, implemented by circuitry, that
determines that a verification error has not occurred in response to the security unit decrypting the data from either the first blob or the second blob based on the hash value calculated at the boot-up, and
determines that a verification error has occurred in response to the security unit neither decrypting the data from the first blob nor from the second blob based on the hash value calculated at the boot-up, wherein
the data in the first blob is encrypted based on the hash value that is calculated from operating-state data generated at hibernation of the information processing apparatus, and the security unit updates the first blob by re-encrypting the data when the information processing apparatus performs the hibernation.

4. An information processing apparatus comprising:
a blob list that includes a first blob and a second blob therein, the first blob and the second blob including data that is encrypted based on a hash value;
a security unit, implemented by circuitry, that decrypts the data from the blob list based on a hash value that is calculated at boot-up of the information processing apparatus;
a verification unit, implemented by circuitry, that
determines that a verification error has not occurred in response to the security unit decrypting the data from either the first blob or the second blob based on the hash value calculated at the boot-up, and
determines that a verification error has occurred in response to the security unit neither decrypting the data from the first blob nor from the second blob based on the hash value calculated at the boot-up, wherein
the data in the first blob is encrypted based on the hash value that is calculated from operating-state data generated at hibernation of the information processing apparatus;
a first registration unit that calculates the hash value from the operation-state data that is generated at the hibernation, and registers the calculated hash value into a configuration register of the security unit; and a second registration unit that
calculates the hash value from the operation-state data that is read out at boot-up from the hibernation, and registers the calculated hash value calculated into the configuration register of the security unit,
wherein the security unit generates the first blob by encrypting the data based on the hash value registered by the first registration unit, and
decrypts the encrypted data from the blob list in response to the hash value registered by the second registration unit at the boot-up from the hibernation corresponding with the hash value used in the generation of the first blob.

5. The information processing apparatus according to claim 1, wherein the security unit generates the second blob by encrypting the data based on the hash value that is previously calculated from the software program needed for the operation of the information processing apparatus, and
the verification unit performs verification at normal boot-up by determining whether to permit decryption of the data based on the hash value calculated from the software program at the normal boot-up.

6. The information processing apparatus according to claim 1, wherein the security unit updates the second blob by re-encrypting the data when the software program is updated.

7. An information processing apparatus comprising:
a blob list that includes a first blob and a second blob therein, the first blob and the second blob including data that is encrypted based on a hash value;
a security unit, implemented by circuitry, that decrypts the data from the blob list based on a hash value that is calculated at boot-up of the information processing apparatus;
a verification unit, implemented by circuitry, that
determines that a verification error has not occurred in response to the security unit decrypting the data from either the first blob or the second blob based on the hash value calculated at the boot-up, and
determines that a verification error has occurred in response to the security unit neither decrypting the data from the first blob nor from the second blob based on the hash value calculated at the boot-up, wherein
the data in the second blob is encrypted based on the hash value that is previously calculated from software program needed for an operation of the information processing apparatus;
a first registration unit that
calculates the hash value from the software program in advance, and
registers the calculated hash value into a configuration register of the security unit; and a
second registration unit that
calculates the hash value from the software program at normal boot-up, and
registers the calculated hash value into the configuration register of the security unit, wherein the security unit
generates the second blob by encrypting the data based on the hash value registered by the first registration unit, and
decrypts the encrypted data from the blob list in response to the hash value registered by the second registration unit at the normal boot-up corresponding with the hash value used in the generation of the second blob.

8. A method for an information processing apparatus that includes circuitry, the method comprising:
decrypting, by the circuitry, data from a blob list based on a hash value that is calculated at boot-up of the information processing apparatus, the blob list including a first blob and a second blob therein, the first blob and the second blob including the data that is encrypted based on a hash value;
determining, by the circuitry, that a verification error has not occurred in response to the decrypting, decrypting the data from either the first blob or the second blob based on the hash value calculated at the boot-up;
determining, by the circuitry, that a verification error has occurred in response to the decrypting neither decrypting the data from the first blob nor from the second blob based on the hash value calculated at the boot-up; and
updating, by the circuitry, the first blob by re-encrypting the data when the information processing apparatus performs hibernation.

9. A non-transitory computer-readable storage medium including computer executable instructions, wherein the instructions, when executed by a computer, cause the computer to perform a method, the method comprising:
decrypting data from a blob list based on a hash value that is calculated at boot-up of an information processing apparatus, the blob list including a first blob and a second blob therein, the first blob and the second blob including the data that is encrypted based on a hash value;
determining that a verification error has not occurred in response to the decrypting, decrypting the data from either the first blob or the second blob based on the hash value calculated at the boot-up;
determining that a verification error has occurred in response to the decrypting neither decrypting the data from the first blob nor from the second blob based on the hash value calculated at the boot-up; and
updating the first blob by re-encrypting the data when the information processing apparatus performs hibernation.

10. The information processing apparatus according to claim 1, wherein
the blob list includes a combination of configuration register values for use at normal boot-up and a combination of configuration register values for use at the boot-up from the hibernation.

11. The information processing apparatus according to claim 1, wherein the data corresponds to an encryption key.

* * * * *